United States Patent [19]

Chandrasekaran

[11] Patent Number: 5,399,943
[45] Date of Patent: Mar. 21, 1995

[54] POWER SUPPLY CIRCUIT FOR A DISCHARGE LAMP

[75] Inventor: T. Chandrasekaran, Bangalore, India

[73] Assignee: Micro-Technology, Inc.-Wisconsin, Menomonee Falls, Wis.

[21] Appl. No.: 996,683

[22] Filed: Dec. 24, 1992

[51] Int. Cl.6 .............................. H05B 37/02
[52] U.S. Cl. ........................ 315/219; 315/276; 315/278; 315/DIG. 5; 315/DIG. 7
[58] Field of Search ............... 315/219, 276, 278, 307, 315/200 R, 209 R, 224, 324, DIG. 5, DIG. 7

[56] References Cited

U.S. PATENT DOCUMENTS

| | | | |
|---|---|---|---|
| 4,388,562 | 6/1983 | Josephson | 315/278 X |
| 5,055,747 | 10/1991 | Johns | 315/307 |
| 5,063,331 | 11/1991 | Nostwick | 315/219 |
| 5,173,643 | 12/1992 | Sullivan et al. | 315/278 X |

*Primary Examiner*—Robert J. Pascal
*Assistant Examiner*—Haissa Philogene
*Attorney, Agent, or Firm*—Robert J. Black

[57] ABSTRACT

An electronic power supply for use with a gas discharge lamp, including a transformer having its primary winding connected in parallel with a capacitor of a series resonant element connected between an inverter and the lamp, effective to limit the voltage from the power supply to a predetermined level.

9 Claims, 3 Drawing Sheets

POWER SUPPLY CIRCUIT FOR A DISCHARGE LAMP

BACKGROUND OF THE INVENTION

1. Field of the Invention

The present invention relates to gas discharge lamps and more particularly to an electronic power supply for use with such lamps.

2. Background Art

Many gas discharge lamps usually require a power supply or ballast circuit for producing an alternate current signal with a high voltage amplitude for effective operation of the lamp. Ballasts of this type are typically separated into two broad categories, the first being of the electromagnetic type while the second is of a true electronic form. Other supplies may provide direct current.

The ballast is a device which performs the following functions:

(a) apply a high voltage across the lamp, in order to fire an arc in the lamp, and (b) limit the current through the lamp, once the arc has been fired.

In the electronic ballast, a resonant element is used to provide the initial starting voltage to the lamp and also to limit the current through the lamp, once the arc has been struck.

DC to AC conversion is done in various ways. One method is series resonance technology. In an uncontrolled self-oscillating series resonance circuit the output voltage across the resonant element is limited only by the "Q" factor of the coil.

A background art search directed to the subject matter of the application and conducted in the U. S. Patent and Trademark Office disclosed the following U.S. Pat. Nos.:

4,175,246
4,472,661
4,553,070
4,722,040
5,034,660
5,063,331

None of the patents uncovered in the search disclosed means for converting current into voltage or an included transformer therein, where depending upon direction of current, either positive or negative voltage applied across the transformer and hence associated switching elements where switch over occurs at zero current crossing.

In most self-commutating series resonating circuits, such as found in the prior art, the transformer included serves as the commutating element. It has been discovered that the transformer typically has two modes of operation. In such an arrangement, the transformer senses the zero-crossing of its primary current and hence causes the polarity of the secondary voltages to change. This then causes the associated switching transistors to switch over when current through them is zero, thus minimizing stress on the transistors.

The transformer also senses a decrease in its primary current and hence causes the polarity of the secondary voltages to change. This causes the transistor to switch over when the current through them is at maximum value. This operation then greatly increases the losses in the transistor and also increases stress on them.

While operation in the first mode is considered desirable, the actual mode of operation of the transformer is a function of the primary current depending thus on the construction of the transformer, etc. In fact, both modes of operation have been observed in the same circuit at different intervals of time.

In the application of electronic ballast for fluorescent lamps, the lamp offers a very high impedance. This presents high "Q" to the resonant circuit. Due to high "Q" a very high voltage is generated across the resonant capacitor. This high voltage causes the lamp to start. After the lamp has ignited, the impedance of the lamp comes down. This limits the voltage and keeps the lamp glowing without damage due to high voltage.

The series resonant circuit is impractical for smaller applications like a non-critical DC to DC converter without some form of Resonant controller.

For fluorescent lamp applications the series resonant circuit can be used for instant start circuits only. For Rapid start application, the voltage buildup should be under control as the ballast has to provide heater current first before the lamp starts.

SUMMARY OF THE INVENTION

The present invention includes a pair of opposite polarized diodes across a first transformer, which force the transformer into operation in the first of the modes described above, thus decreasing power loss in the transistor as well as reducing stress on them and hence increasing reliability of the ballast circuitry.

Normally the lamp is connected across the capacitor of the resonating element, ensuring that the lamp filaments are heated before the arc is struck, thus ensuring long lamp life start time.

As described above, and in my co-pending patent application (Ser. No. 07/920,670) filed Jul. 28, 1992, now U.S. Pat. No. 5,291,101 entitled "ELECTRONIC BALLAST FOR DISCHARGE LAMPS", the innovative use of diodes across the first or drive transformer appears to reduce the complexity of circuit operation making it easier to determine and control the ballast operation. The result is a reduction in material costs along with increased reliability of the ballast. However, the present invention also includes a second transformer across the resonant capacitor to limit the voltage to a predetermined level. This will produce an AC voltage source useful for most applications including electronic ballasts for fluorescent lamps.

The transformer across the resonant capacitor can also serve as the heater current source for an electronic ballast. The voltage across the resonant capacitor can be applied to the fluorescent lamp through a capacitor acting as a current limiting reactive impedance. The transformer also provides isolated heater voltage for the lamps. Multiple lamps can also be connected in this advanced series resonant circuit.

For DC to DC application, the transformer can serve as an isolation or output transformer. The secondary of the transformer can be rectified and filtered through an inductor and capacitor or only a capacitor depending upon the load condition. The filter should ensure high "Q" for the resonant circuit. The output is unregulated DC but remains constant if the input voltage is constant. Hence, providing a simple boost/buck regulator at the input state will provide a regulated DC to DC converter output.

BRIEF DESCRIPTION OF THE DRAWINGS

A better understanding of the present invention may be taken from a consideration of the following detailed description taken in conjunction with the accompanying drawings in which.

DESCRIPTION OF THE PREFERRED EMBODIMENT

Figure 1:
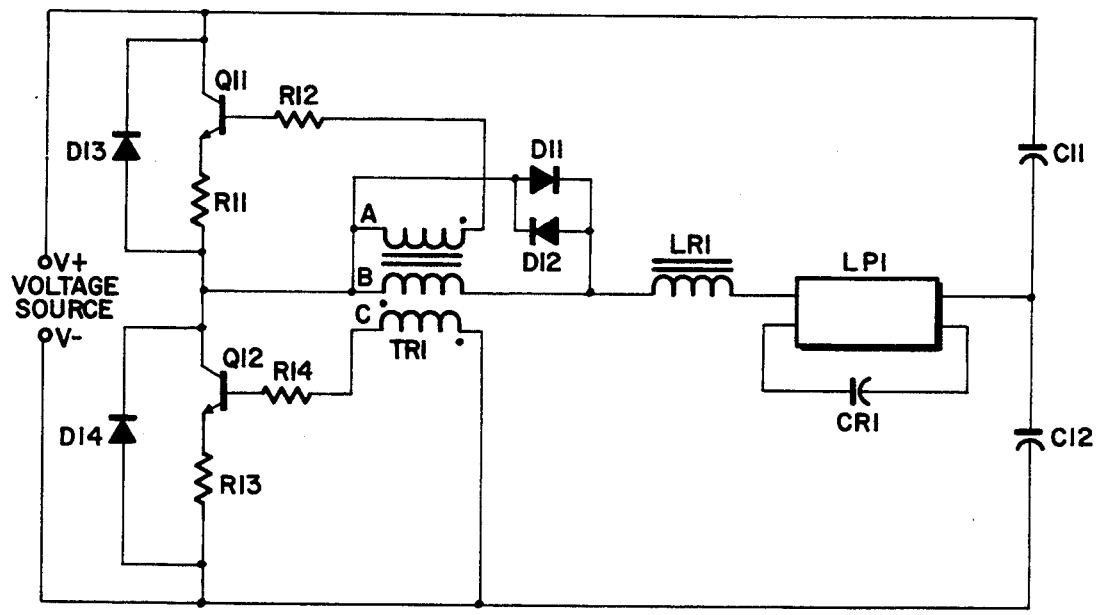
FIG. 1 is a schematic diagram of a prior art electronic ballast circuit for use with fluorescent lamps, employing bipolar transistors as the switching elements.

Referring now to the drawings of the present invention, it should be noted in FIGS. 1, 2, 3 and 4 a positive and negative voltage bus are derived from a voltage source which consists of a bridge rectifier. In practical embodiments of the present invention the rectifier is connected to an AC power source. It is by means of such bridge rectifiers that the AC input voltage normally derived from the AC line is rectified and the resultant direct current filtered using capacitors connected in a "valley-fill" configuration. The use of this configuration causes current to be drawn for a longer period during each AC cycle thus increasing the power factor of the ballast and also reducing harmonic distortion to the input line current.

It has also been found convenient to include a fuse in series with the alternating current supply as well as a metallic oxide varistor across the AC supply to protect against surge voltages that may be present in the alternating current line. It should be noted that the particular details of the bridge circuitry are well known in the prior art, and thus accordingly do not form a part of the present invention and thus have not been shown in detail.

Referring now to FIG. 1, the basic resonating element consists of an inductor LR1 and a capacitor CR1 connected in series. Power is fed into the resonating element to a half bridge inverter circuit consisting of transistors Q11 and Q12 and associated circuitry transformer TR1.

From the AC line, a DC source is generated using rectifier and filter (not shown in the FIG. 1). The circuit comes under the category of a half bridge inverter. The transistor Q1 and Q12, along with inductor LR1, capacitor C1 and voltage transformer TR11, form the power oscillator. The frequency of operation depends upon the inductor (L) and capacitor (C) values. The capacitors C11 and C12 provide center point for the supply voltage.

It has been found that electronic ballasts employing series resonance technology are ideally more reliable and cost effective compared to that found in other technology. However, typical series resonant based ballast circuits operate at a frequency determined by values of inductor LR1 and capacitor CR1. Accordingly, transistors Q11 and Q12 will then switch over when the current becomes zero. In the usual arrangement, the transformer sends current towards inductor LR1. When the current is positive, transistor Q11 turns on, and during negative current, transistor Q12 operates. As a practical matter, the self-inductance of transformer TR1 may dominate and transistor switch over occurs when the current reaches the maximum and starts to descend. At this point, the transistors get the maximum current. Instead of improving the reliability, the series resonant ballast may reduce reliability.

Accordingly, in the present circuitry, the provision of diodes D11 and D12 across the primary winding B of transformer TR1 conduct current from transistors Q11 and Q12 to inductor LR1 in both directions. The diodes D11 and D12 convert current into voltage for transformer TR1. Thus, the switch over from transistor Q11 and Q12 occurs at zero current crossing. With this arrangement, the questionable operation of the typical series resonant ballast is eliminated. Thus, as the current zero crossing ensures the switch over, the ballast inherently becomes much more reliable. It has been found that the inclusion of the diodes, such as D11 and D12 across the transformer TR1, forces the transformer into operation in the zero crossing mode, thus decreasing power loss in the transistor, reducing stresses on them and increasing reliability of the ballast.

Figure 2:
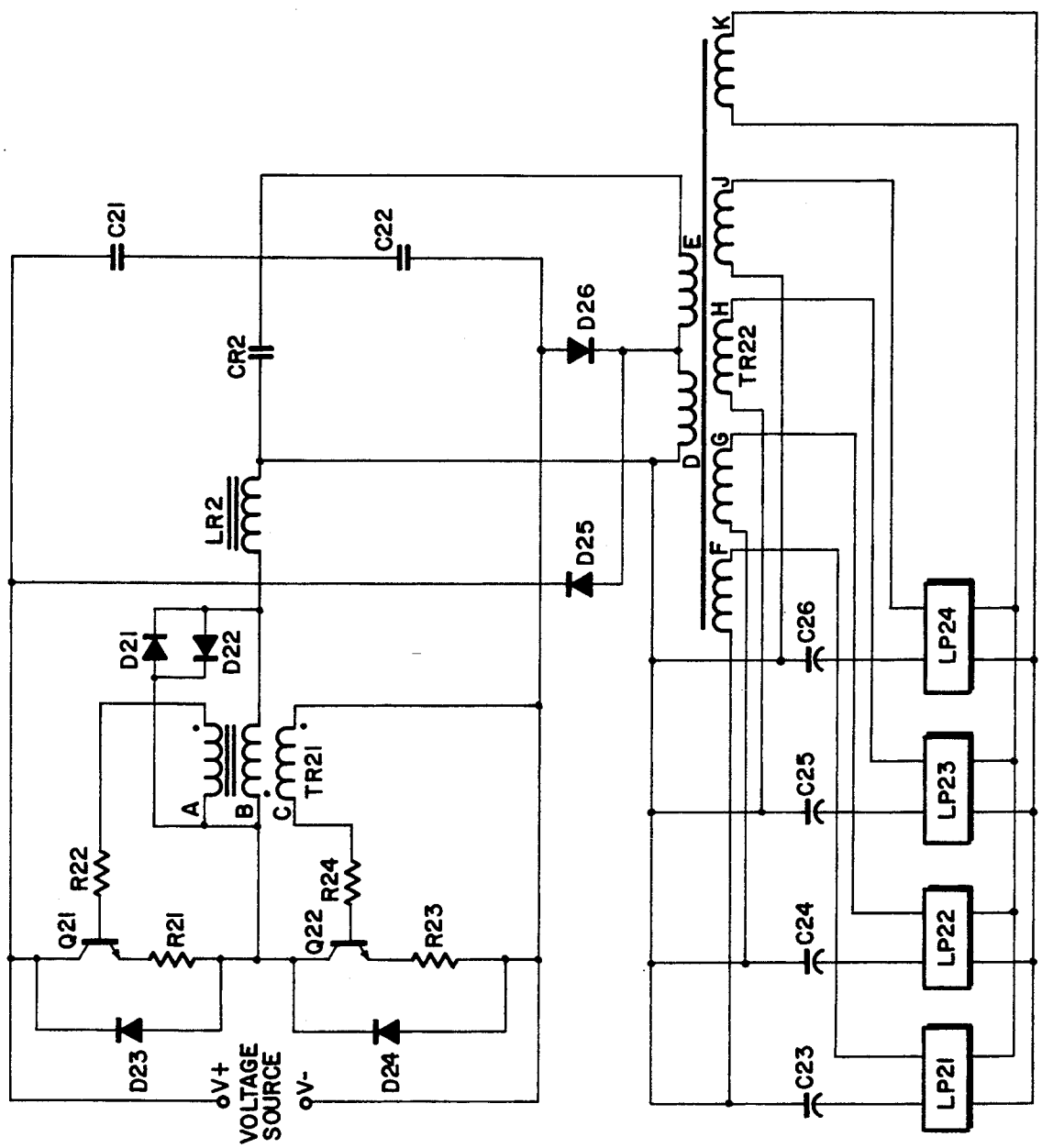
FIG. 2 is a schematic diagram of an electronic ballast circuit for use with fluorescent lamps employing a transformer across the resonant capacitor which acts as a heater current source and also as a resonant controller. Accordingly, it is intended for use with "rapid start" type fluorescent lamps.

Referring now to FIG. 2, the oscillator circuit and the series resonant component circuitry is similar to that previously described in connection with FIG. 1. Additional circuitry consists of transformer TR22 whose primary winding is connected across resonant capacitor CR2 further includes secondary windings F, G, H, J and K which are connected as shown through capacitors C23, C24, C25 and C26 to lamps LP21, LP22, LP23 and LP24.

Transformer TR22 has a primary with a very high inductance connected across capacitor CR2. This high inductance does not alter the resonant characteristics of inductor LR2 and capacitor CR2. Diodes D25 and D26 act to limit the voltage. When the voltage builds up beyond a predetermined limit across capacitor CR2 at transformer TR22 between windings D and E this forces energy from inductor LR2 into the DC input bus, thus ensuring that energy at capacitor CR2 is always limited. The maximum voltage is determined by the tapped point of transformer TR22 between windings D and E. As the limiting is done at the DC input level, the output voltage depends upon the input voltage level. The voltage across capacitor OR2 is applied to the fluorescent lamps via capacitor C23, C24, C25 and C26. Transformer TR22 has multiple low voltage isolated secondary windings F, G, H, J and K to provide low voltage for heater current for lamps LP21, LP22, LP23 and LP24. Should a lesser number of lamps be required, only as many capacitors and secondary windings on transformer TR22 will be utilized as needed. Due to the constant voltage across capacitor CR2, the heater current is also constant. If the lamp is not connected, there is no normal build up of voltage across capacitor CR2 as would be the case with a standard series resonant circuit.

Figure 3:
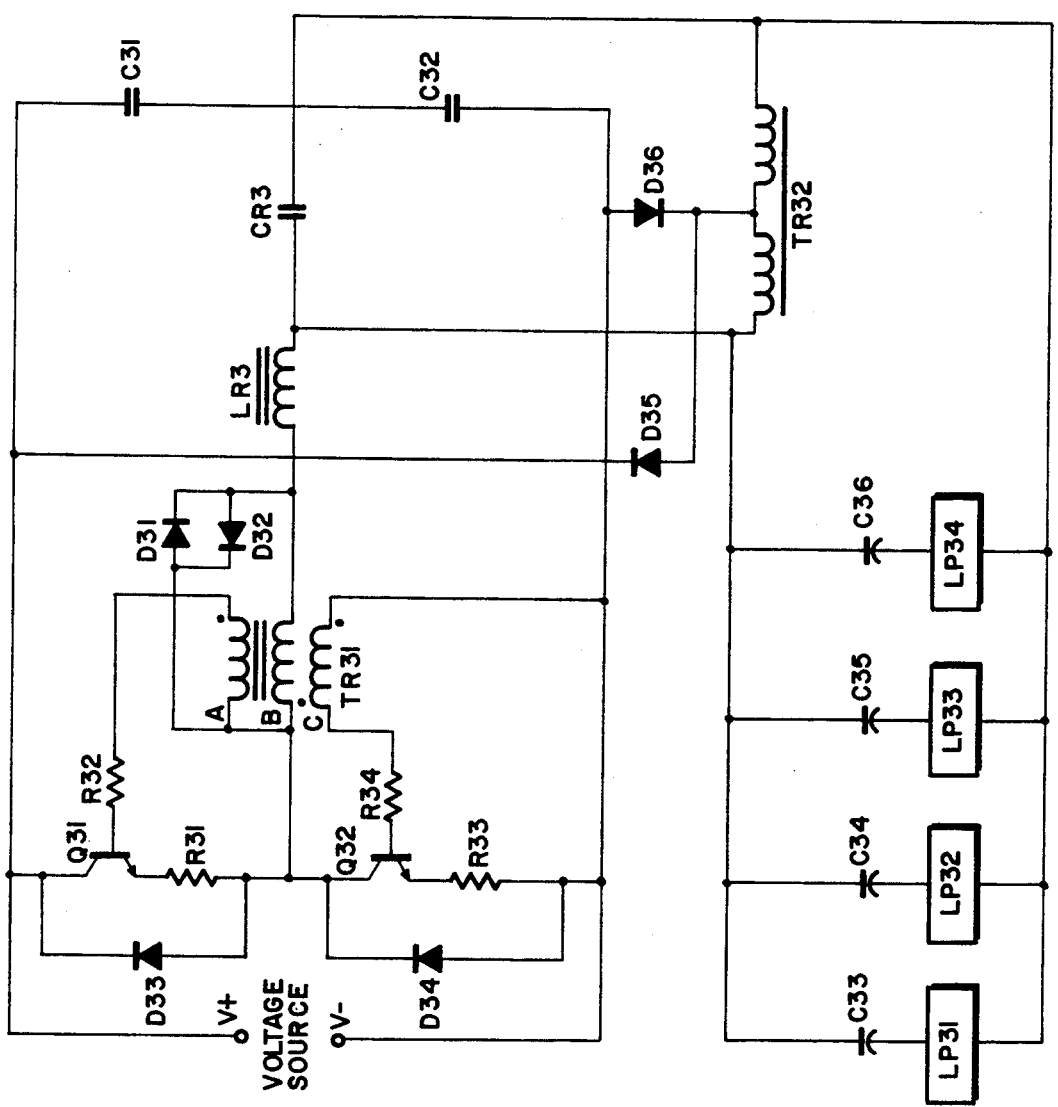
FIG. 3 is a schematic diagram of an electronic ballast circuit for use with fluorescent lamps employing a transformer across the resonant capacitor but intended only for use with "instant start" fluorescent lamps.

Referring now to FIG. 3, the circuitry is similar to that shown in FIG. 2 as far as the inverter circuitry is concerned like that shown in FIG. 1. The basic difference is that transformer. TR32 and diodes D35 and D36 as well as capacitors C33, C34, C35 and C36 are the additional components supplied. The arrangement shown in FIG. 3 functions in a manner similar to that described in connection with FIG. 2 except that no low voltage secondaries are included on transformer TR32 inasmuch as lamps LP31, LP32, LP33 and LP34 are of the "instant start" type rather than the "rapid start" type as associated with FIG. 2. FIG. 3 for use with "instant start" circuitry would not require the filament connections as shown in FIG. 2. Otherwise the circuitry and the function are essentially similar in operation.

Figure 4:
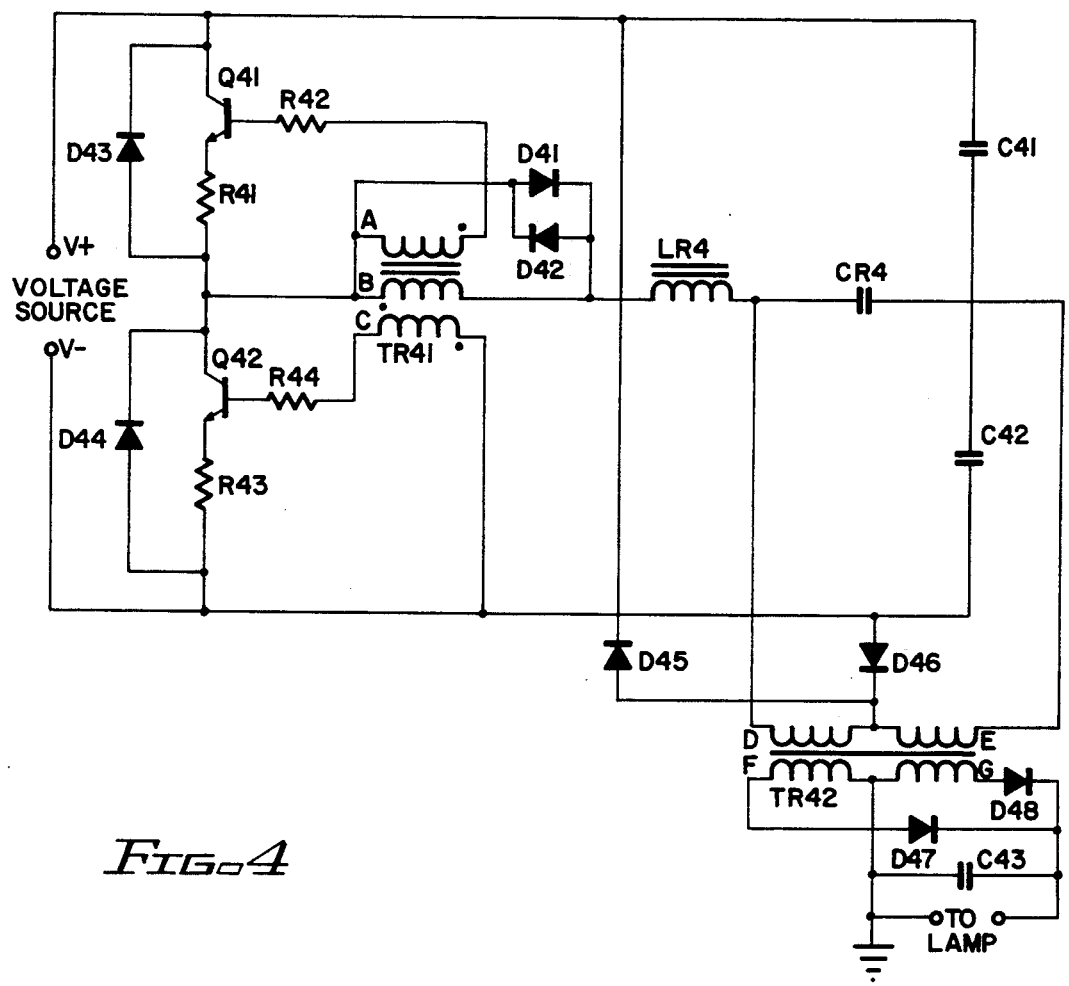
FIG. 4 is a schematic diagram of a power supply for use with gas discharge lamps including a transformer across the resonant capacitor and a rectified secondary output for use with lamps requiring a DC voltage.

Referring now to FIG. 4, a DC voltage supply such as might be utilized with halogen lamps or similar functions is shown. Circuitry is also similar to that previously described as far as the inverter circuitry is concerned with the additional components being transformer TR42, diodes D48 and D47 and capacitor C43. In this instance, the transformer TR42, which functions similar to the transformers TR22 and TR32 in FIGS. 2 and 3, respectively, including a secondary winding center tapped consisting of windings F and G, with output taken from the secondary being rectified by diodes D48 and D47. A simple capacitor is shown for filtering purposes for use with small loads. In a manner similar to that described to the above ballast, the alternating current generated across the capacitor CR4 is coupled to the transformer TR42, with output being full wave rectified and filtered as indicated. The use of additional filtering consisting of inductors, capacitors would also be effective, if required, depending upon load requirements.

From the foregoing it will be obvious that as described above the innovative use of a transformer placed across the resonant capacitor in a series resonant power supply is effective to limit the voltage up to a predetermined level, thus providing a more effective and reliable power source for gas discharge lamps.

While but only a few embodiments of the present invention have been shown, it will be obvious to those skilled in the art that numerous modifications may be made without departing from the spirit of the present invention which shall be limited only by the scope of the claims appended hereto.

What is claimed is:

1. A power supply circuit for a gas discharge lamp comprising:
    an inverter circuit connected to a source of direct current;
    said inverter circuit including the first and second switching transistors;
    a first transformer including a primary winding, first and second secondary windings;
    said first secondary winding, 180 degrees out of phase with said second secondary winding;
    said first and second secondary windings each including a circuit connection to said first and second switching transistors, respectively;
    a resonant element consisting of an inductor and a capacitor connected in series between said lamp and said inverter circuit;
    means to ensure said first transformer senses a zero crossing of current comprising a pair of oppositely poled diodes connected in parallel with said primary winding of said first transformer;
    a second transformer connected in parallel with said resonant element capacitor;
    said second transformer including at least two primary windings;
    whereby said second transformer operates to limit the voltage of said power supply to a predetermined level.

2. A power supply circuit as claimed in claim 1 wherein:
    said second transformer includes at least two primary windings;
    and at least two secondary windings connected to said lamp to provide isolated heater voltage for operation of said lamp.

3. A power supply circuit as claimed in claim 2 wherein:
    there is further included at least one additional capacitor connected between an associated secondary winding and said lamp.

4. A power supply circuit as claimed in claim 1 wherein:
    said second transformer further includes a secondary winding;
    and rectifier means connected to said secondary winding operated to provide direct current from said power supply to said lamp.

5. A power supply circuit as claimed in claim 4 wherein:
    there is further included a filter means connected between said rectifier means and said lamp.

6. A power supply circuit as claimed in claim 1 wherein:
    said switching transistors are each of the bipolar type.

7. A power supply circuit as claimed in claim 1 wherein:
    said second transformer includes at least two secondary windings connected to said lamp to provide isolated heater voltage for operation of said lamp.

8. A power supply circuit as claimed in claim 1 wherein:
    there is further included a circuit connection from said resonant element through said capacitor to said lamp.

9. A power supply circuit as claimed in claim 1 wherein:
    there is further included at least one additional capacitor forming a circuit connection from said resonant element to said associated lamp.

* * * * *